Figure 1:
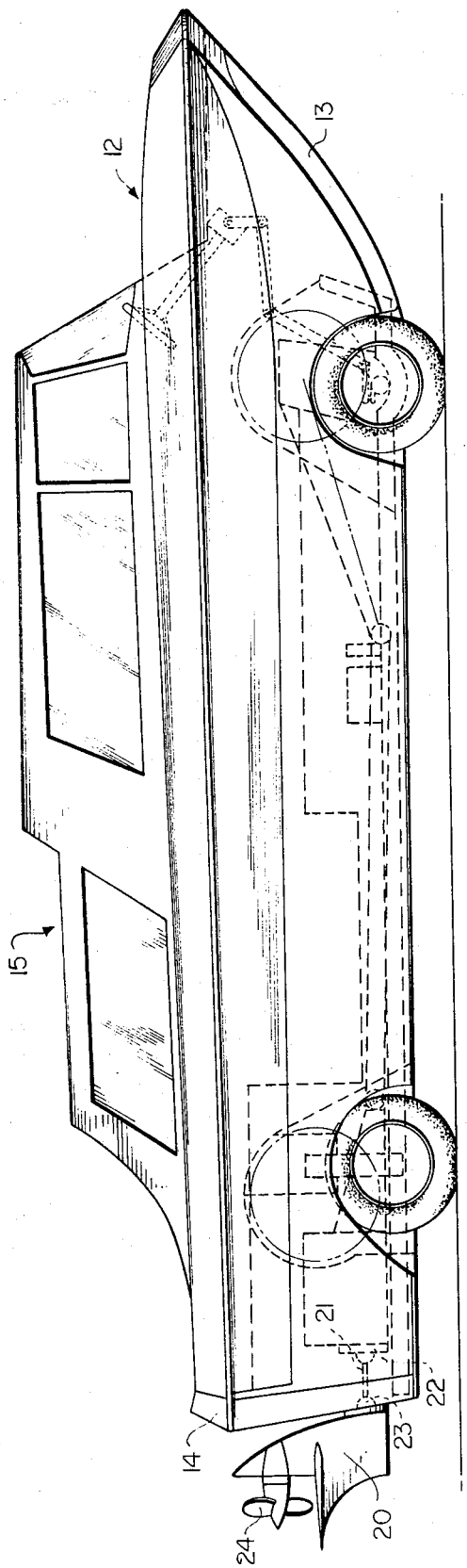

United States Patent [19]
Asbeck

[11] 3,765,368
[45] Oct. 16, 1973

[54] AMPHIBIOUS VEHICLE
[76] Inventor: Walter K. Asbeck, 2116 Glen Field Ter. South, Charleston, W. Va.
[22] Filed: Dec. 8, 1970
[21] Appl. No.: 96,150

[52] U.S. Cl. ............................................. 115/1 A
[51] Int. Cl. ............................................. B60f 3/00
[58] Field of Search .................. 115/1 A, 1 R; 9/1 A, 9/1 T

[56] References Cited
UNITED STATES PATENTS
| 2,400,132 | 5/1946 | Porter | 115/1 R |
| 3,584,592 | 6/1971 | Perrine | 115/1 R |
| 3,566,825 | 3/1971 | Ruf | 115/1 R |
| 3,486,477 | 12/1969 | Pender | 115/1 R |

Primary Examiner—Milton Buchler
Assistant Examiner—E. R. Kazenske
Attorney—Christen & Sabol

[57] ABSTRACT

An amphibious vehicle is propelled by a conventional inboard mounted engine which is connected by conventional automobile transmission and differential mechanisms for driving a pair of wheels on land and also connected with a conventional inboard-outboard marine drive mechanism, all of the wheels being mounted on air suspension means which are pivotally connected with the hull to allow the wheels to be raised for marine use.

20 Claims, 11 Drawing Figures

PATENTED OCT 16 1973

SHEET 1 OF 5

3,765,368

INVENTORS
WALTER K. ASBECK

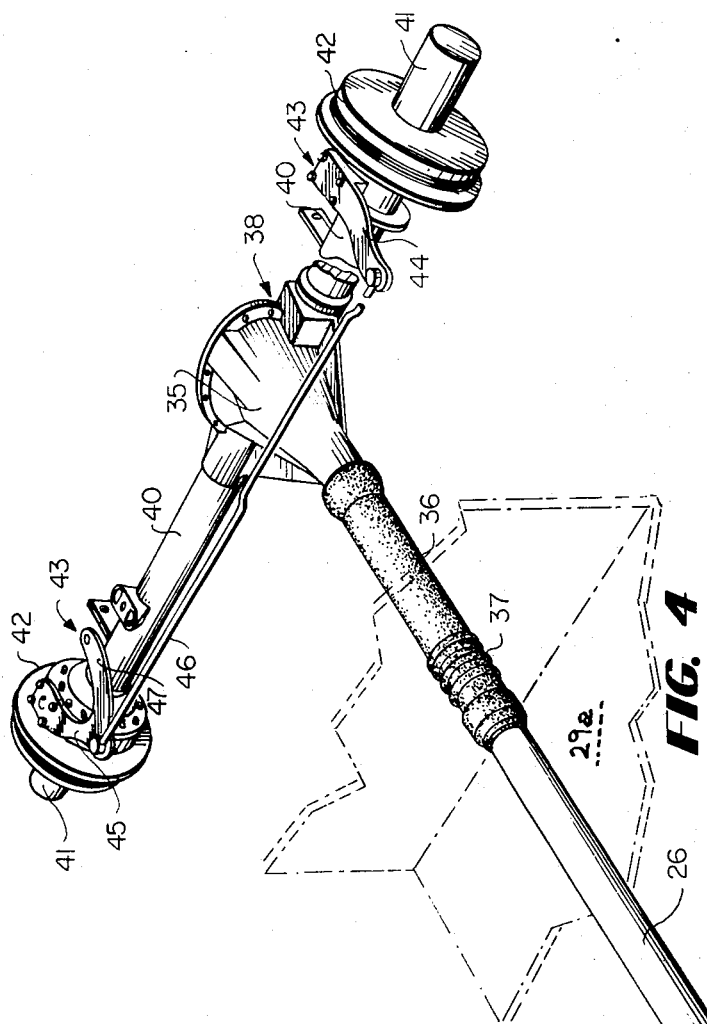
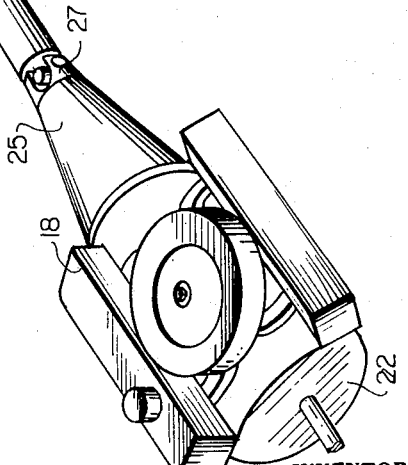
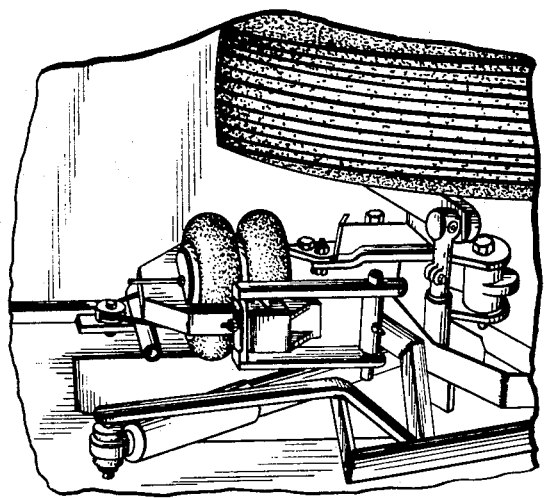
FIG. 4
FIG. 5
INVENTOR
WALTER K. ASBECK

INVENTOR
WALTER K. ASBECK

INVENTOR
WALTER K. ASBECK

AMPHIBIOUS VEHICLE

This invention relates to an amphibious vehicle capable of being constructed predominantly from standard marine and automotive parts and assemblies with a minimum number of specially fabricated elements.

For this purpose a standard automotive engine is mounted in a hull together with its usually associated transmission and clutch mechanisms which are connected to drive a standard automotive differential means arranged in a housing which supports two wheels to be driven from the differential, in accordance with conventional automotive practice. In addition, housing of this type which includes means for allowing the driven wheels to be steered are well known and, consequently, a feature of the invention is to provide means for supporting such a housing on a marine hull in a manner to permit the entire assembly to be raised or lowered depending on whether the hull is to be water borne or operated as a land vehicle.

Another feature of the invention is the provision of a marine propulsion system such as the conventional so-called "inboard-outboard" type connected by selective clutch means with the aforementioned automotive engine to drive the hull when water borne.

Still another feature of the invention is the provision of resilient suspension means for the wheels of the vehicle, such as a conventional air spring, arranged on pivotal supports to permit raising or lowering of the wheels.

Yet another advantage is the provision of simple locking means which can not be unlocked when the vehicle is land based such as means to allow quick conversion between land and water borne use.

This invention relates to an amphibious vehicle capable of being constructed predominently from standard marine and automotive parts and assemblies with a minimum number of specially fabricated elements.

For this purpose a standard automotive engine is mounted in a hull together with its usually associated transmission and clutch mechanisms which are connected to drive a standard auto-motive differential means arranged in a housing which supports two wheels to be driven from the differential, in accordance with conventional automotive practice. In addition, housing of this type which include means for allowing the driven wheels to be steered are well known and, consequently, a feature of the invention is to provide means for supporting such a housing on a marine hull in a manner to permit the entire assembly to be raised or lowered depending on whether the hull is to be water borne or operated as a land vehicle.

Another feature of the invention is that a conventional marine propulsion system of the so-called "inboard-outboard" type is connected by selective clutch means with the aforementioned automotive engine to drive the hull when water borne.

Still another feature of the invention is the provision of resilient suspension means for the wheels of the vehicle, such as a conventional air spring, arranged on pivotal supports to permit raising or lowering of the wheels.

Yet another advantage is the provision of simple locking means which can be unlocked by depressurization of the air spring means to allow quick conversion between land and water borne use.

Other objects and advantages will be apparent to those skilled in the art after reading the following specification in connection with the annexed drawings, in which:

DESCRIPTION OF INVENTION

Figure 2:
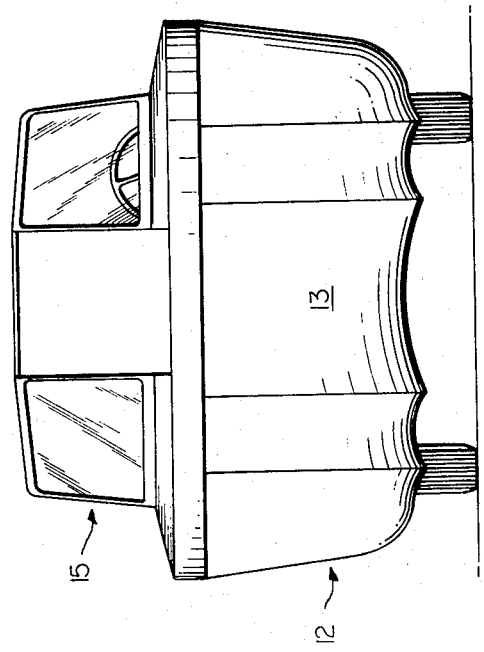
Figure 3:
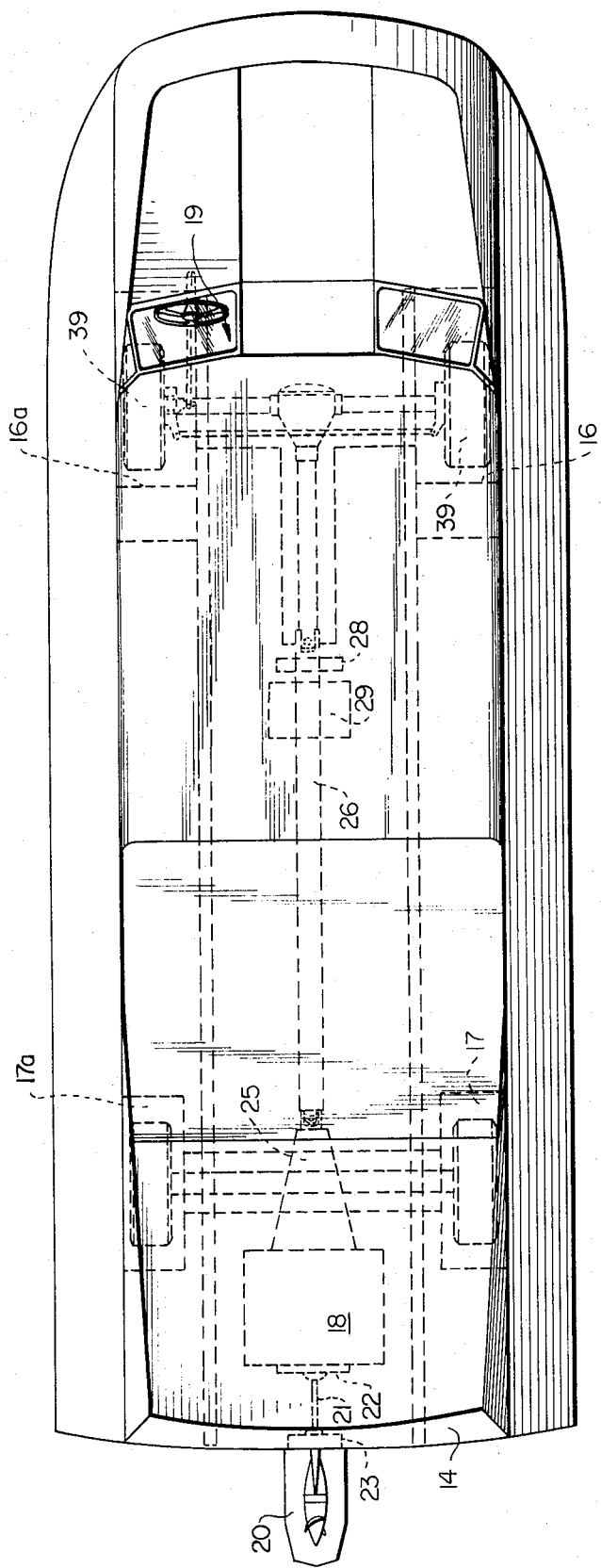
Figure 6:
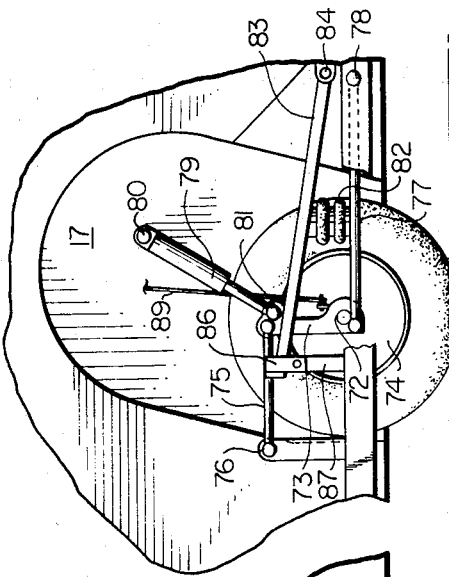
Figure 8:
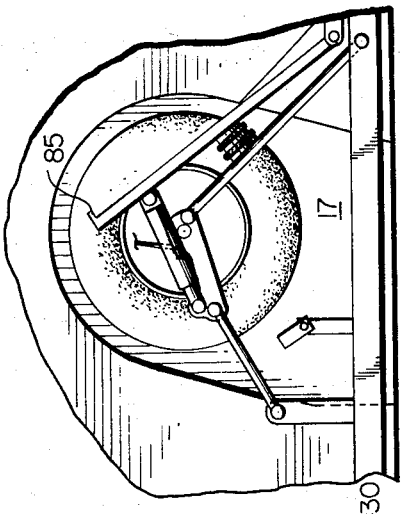
Figure 7:
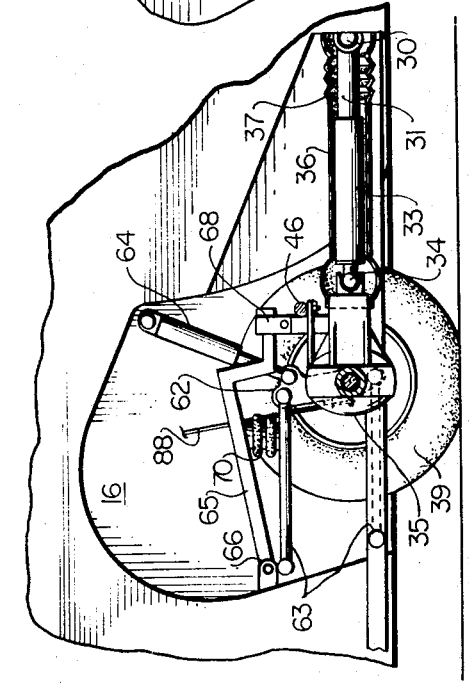
Figure 9:
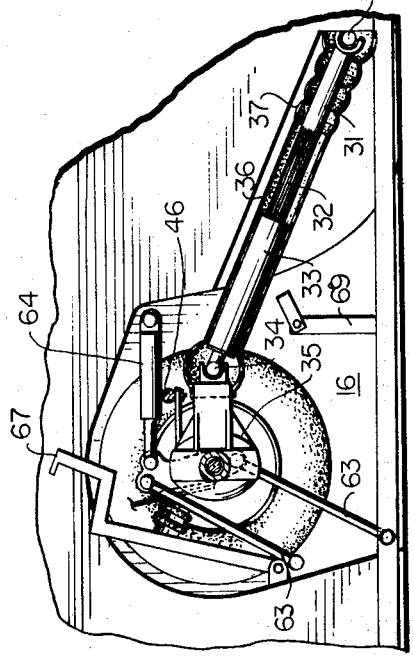
Figure 11:
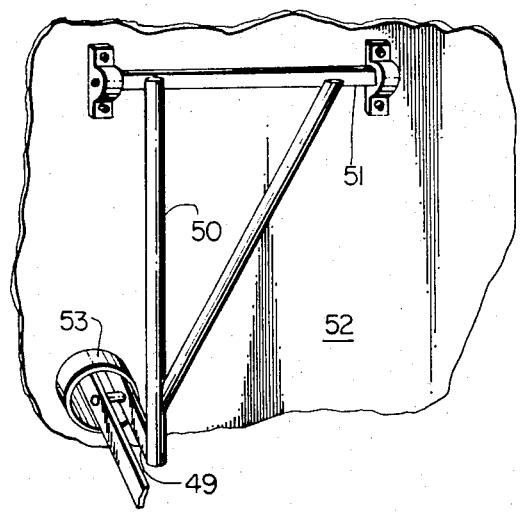
Figure 10:
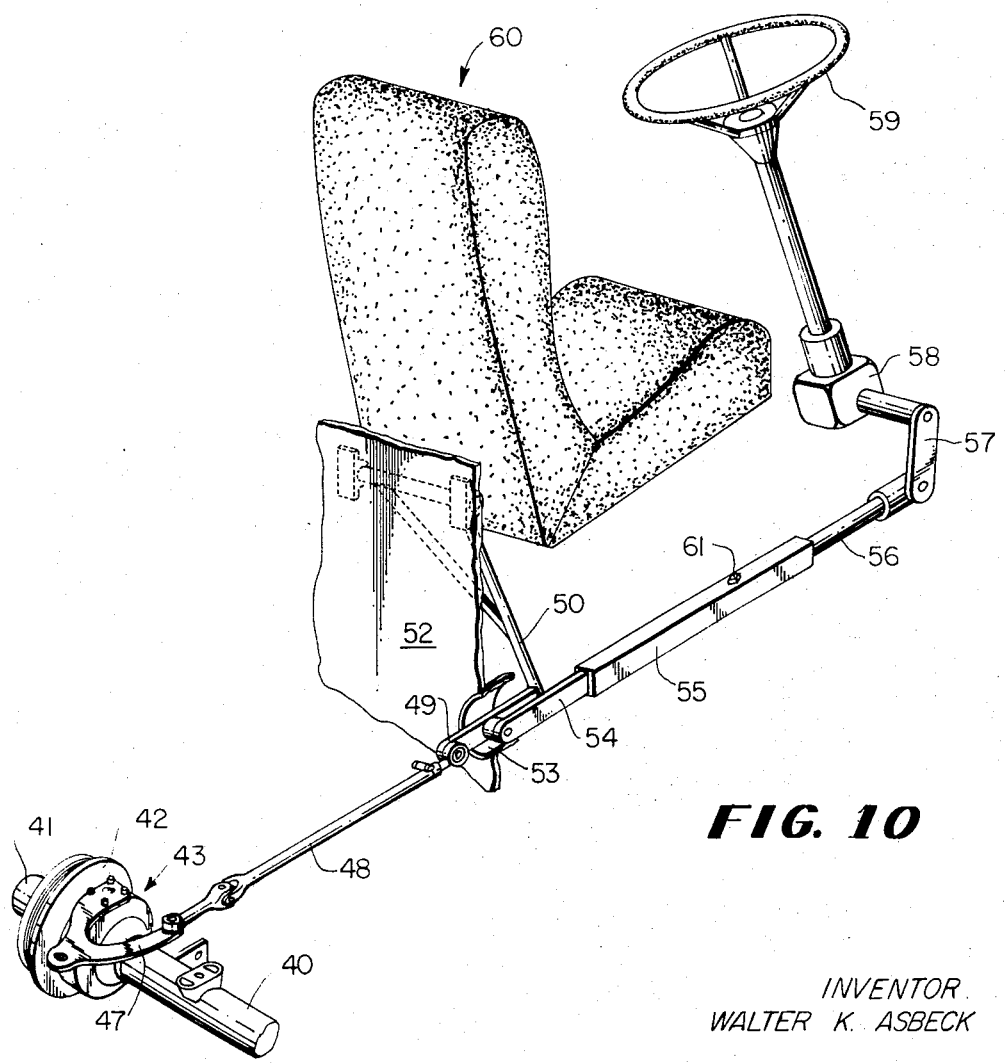

In the drawings, FIG. 1 is a side elevation of a preferred form of amphibious vehicle constructed in accordance with the teachings of this invention and shown with the supporting wheels lowered for travel on land; FIG. 2 is a front elevation; FIG. 3 is a plan view; FIG. 4 is an isometric view of the engine and the drive train to the front axles; FIG. 5 is an isometric detailed view of the suspension of a front wheel; FIG. 6 is a vertical cutaway view of the right front wheel as viewed from the center of the vehicle with the wheel lowered; FIG. 7 is a view of the wheel as in raised position for use in the water; FIG. 8 is a vertical cutaway view of the right rear wheel as viewed from the center of the vehicle with the wheel lowered; FIG. 9 is a view of the wheel in raised position; FIG. 10 is an isometric detail view of the connections for steering the front wheels, and, FIG. 11 is an isometric view of a pivotal bracket shown in FIG. 10, but viewed from the opposite direction.

Turning now to the drawings, it will be seen that the invention comprises a vehicle having a hull 12 provided with a bow portion 13 and a transverse transom, or stern section 14 and superstructure 15 the construction of which forms no part of the invention. The under side of the hull is provided with four upwardly extending wells, those for the front land wheels being indicated by numerals 16 and 16a, and the wells for the rear wheels by numerals 17 and 17a.

Power for propelling the vehicle, both on land and in the water, may be provided by an engine 18 mounted in the hull by conventional supports (not shown) and controls for the vehicle are arranged at an operator's station, indicated by numeral 19 which is shown as being at the left forward portion of the hull, although it could be located on the right hand side.

For propelling the vehicle in water a so-called "inboard-outboard" propeller drive mechanism 20 may be employed, having an input shaft 21 connected with the engine 18 by a clutch and reversing gear mechanism indicated by numeral 22, the details of which form no part of the invention. Controls for these mechanisms can be arranged at the operator's station 19 and the inboard-outboard drive can be mounted on the transom on a horizontal trunnion mounting 23 which permits the propeller 24 to be carried in a raised position (as shown in FIG. 1) when the vehicle is on land, but allows it to be placed in operative position when the inboard-outboard mechanism is swung down by rotating the entire assembly about the axis of the trunnion 23.

For driving the vehicle on land the engine 18 may be of conventional automobile construction including a standard clutch and transmission mechanism 25 provided with controls (not shown) which can be manipulated from the operator's station 19. Output of the transmission can be transferred to a shaft 26 through a first universal joint 27 and the forward end of the shaft is supported by a hanger 28, attached to the lower side of the hull where the shaft passes to the exterior thereof through a stuffing box 29. At that end the first shaft is connected by a second universal joint 30 with a short shaft 31, the forward end of which is splined at 32 (see FIG. 7) for non-rotatable axially sliding engagement with in a hollow drive shaft 33 which is attached at its other end by a third universal joint 34 to the driven shaft of a conventional automobile differential gear mechanism 35. The section of the drive line between the differential and the universal joint 30 may be covered by a tubular waterproof flexible sleeve 36, a portion of which may be annularly fluted, as at 37, to allow for axial expansion and contraction.

The differential mechanism itself forms one element of an axle assembly, indicated by numeral 38 which provides a mounting for steering and driving a pair of conventional automobile wheels 39. Such assemblies are well known in the art and one suitable type is made and sold under the trademark Spicer, although it should be understood that other assemblies could be used. These mechanisms include horizontal tubular housings 40, extending outwardly from the differential to surround a pair of drive shafts and power-transmitting univeral joints (not shown) to drive the steerable wheel shafts 41 including brakes 42 which are supported by the housings by means of steering bearings, indicated generally by numeral 43. Some axle assemblies also include additional universal joints (not shown) at the outside axle ends of the differential housings so that the axles can be pivoted around these universal joints. The steering of the shafts is controlled by attached arm 44 and 45, connected with each other by an adjustable tie rod 46. Arm 45 also has an extension 47 for pivotal connection with an idler rod 48, the other end of which connects pivotally with the L-shaped lower extension 49 of a hanger 50 which is pivotally supported at its upper end 51 on a bulkhead 52 of the hull which may form the forward wall of the well 16 and can be provided with a stuffing box 53 which allows longitudinal movement of the L-shaped extension 49 while preventing the entry of water into the interior when the vehicle is in the water. Also pivotally connected with the arm 49, is a rod 54 which is provided at the other end with a hollow extension 55 within which is slidably received another rod 56, having its forward end pivotally connected with the Pitman arm 57 of a conventional automotive steering gear contained within a housing 58, supported on the interior frame work of the hull to position the steering wheel 59 in a convenient position at the operator's station 19 in front of the seat 60. In this connection, it should be noted that rod 56 would be loosely slidable in the extension 55 but for the insertion of a removable transverse pin 61 which passes through aligned openings in the extension and rod. The pin, when removed, prevents rotatable movement around the steering axis of the front wheels and permits the raising of the assembly 38 into the well when the hull is to be floated.

As can be seen in FIGS. 6 and 7, each of the housings 40, of the front assembly 38 are provided with a vertical bracket 62 which extends above and below the housing to provide an anchor for pivotal connnection with one end of a parallelogram suspension means composed of two parallel rods 63, the other ends of these rods being pivotally attached to the framework of the hull within the well 16. The bracket 62 also provides a pivotal connection with one end of a conventional automobile shock absorber means 64, the other end of which is pivotally secured to an upper portion of the hull framework in the well 16. In addition, an arm 65 has its forward end pivotally connected to a support 66 attached to the hull frame, with its rear end being provided with an upwardly extending lip 67 to serve as a detent to hold an inverted U-shaped member 68 in engagement with the free end of the arm when in the wheels down position of FIG. 6. The U-shaped member is pivotally attached to an upright post 69, attached to the hull framework. The arm 65 serves as the upper support for a spring system for the wheel, such as an air spring means 70, the lower end of which is connected with one of the suspension rods 63.

Obviously, since FIGS. 6 and 7 show only the right front wheel mounting, the mounting for the left wheel is similar but arranged as a mirror-image of the wheel shown and described. By the same token, the rear wheel mountings are disposed as mirror-images of each other and only the right rear wheel mounting will be described, as illustrated in FIGS. 8 and 9.

This wheel indicated by numeral 71, is mounted on a stub axle 72 carried by a bracket 73 which extends vertically when the wheel is lowered as in FIG. 8, and is connected by means of an axle to its counterpart on the left wheel. The bracket also can support a conventional brake mechanism 74, while the bracket itself is carried by having a pivotal connection, at its upper end, with the rear end of a horizontal upper tie rod 75 whose forward end is pivotally attached at 76 to a frame member of the hull. The lower end of bracket 73 is pivotally connected with the forward end of a lower tie rod 77 whose rear end is pivotally attached at 78 to another frame member of the hull. In order to maintain the wheel 71 in a vertical plane, while permitting vertical movement, the pivots 76 and 78 must confine the two tie rods to movement about parallel axes. The tie rods are constrained from lateral motion by means of a track bar (not shown) attached at one end to the top of bracket 73 and at the other end to an upward extension of the frame. In addition, a conventional shock absorber 79 is connected pivotally to the hull frame at 80 and to the upper end of the bracket at 81. The weight of the hull is transmitted to the wheel mounting by a conventional air spring device 82 which is connected between a medial point of tie rod 77 and an elongated support bar 83, one end of which is pivotally connected to the hull at 84. The other end of the bar is provided with an upwardly projecting lip 85 which engages the inverted U-shaped saddle member 86, itself being pivotally attached to an upstanding member 87 attached to the hull frame, to permit release of bar 83 when the wheel is raised, as in FIG. 9.

In this connection it should be noted that the various air spring devices, indicated by numerals 70 and 82, include flexible air bags of generally cylindrical configuration which can be pressurized to regulate the degree of resistance to vertical movement of the wheels during travel over rough terrain. When the air bags are pressurized the downward movement of the wheels when in the water is limited by the amount of extension of the shock absorbers 64 and 79, and stops (not shown).

The wheels are capable of being raised to the positions shown in FIGS. 7 and 9, and retained in those positions, by means of a cable 88, attached to the bracket 62 of the front wheel and a cable 89 attached to bracket 73 of the rear wheel, these cables passing through suitably provided openings in the respective wells 16 and 17 for connection with a manual, or power-operated winch means (not shown) mounted within the upper area of the hull.

With the wheels in the lowered positions of FIGS. 6 and 8 and with the locking pin 61 connecting the steering extension 55 with the rod 56 (as shown in FIG. 10) and, after taking precaution to see that the marine drive mechanism 20 has been retracted as shown in FIG. 1, the vehicle may be driven on land in the conventional manner under control of the operator sitting at the control station 19. The vehicle may be driven into the water from a beach or a loading ramp in order to be used as a marine vehicle.

While the vehicle may be navigated, with wheels down, when the inboard-outboard drive 20 has been swung down to put the propeller 24 in the water, it is preferable for the sake of speed and economy, to raise the wheels to the positions of FIGS. 7 and 9. To do so the front wheels are placed in the straight-ahead position and the pin 61 is removed. In order to unlock the U-shaped members 68, the air pressure in the suspension means 70 is released so that the members can be swung over the lip 67 to the position of FIG. 7 in the case of the front wheels. The pressure is also released from the suspension means 82 of the rear wheels to allow locking members 86 to be swung over the lips 85 to the positions of FIG. 9. Having done this, all four wheels can be raised by means of the cables 88 and 89.

When the vehicle returns to land, the above procedure is reversed. The wheels are lowered into the water by the cables and the locking members 68 and 86 are returned to the upright positions over the arms 65 and 83 and the suspension means 70 and 82 are repressurized from an on-board compressor (not shown). When the pin 61 has been replaced to connect the steering mechanism the propeller 24 can be used to manuever the vehicle firmly towards the beach or landing ramp in a bow first direction until the front wheels 39 are in contact. The engine can then be used to drive the wheels with, or without, the assistance of the propeller for a short distance, or until the rear wheels are in contact after which the marine drive can be declutched and swung back to its inoperative position.

Other modifications and improvements may be made which would come within the scope of the annexed claims.

We claim:

1. In amphibious vehicles including a planing type water borne hull, the combination including motive power means mounted in said hull, marine propulsion means mounted at the stern of the hull, a front pair of driven ground-engaging wheels including resilient suspension means for each wheel mounted in wells contained within the periphery of said hull and open to the water, said front driven pair of wheels including a differential housing and driving axles extending transversely of the hull within a transverse well connecting said wheel wells, drive shaft means connected with the differential housing means and extending longitudinally of the hull, means for selectively connecting said motive power means to drive said marine propulsion means and said drive shaft means, another pair of ground-engaging wheels including resilient suspension means for each wheel also mounted in wells contained within the periphery of said hull and open to the water, said resilient suspension means for both pairs of wheels including means for maintaining said wheels in a lowered position for driving on land and in a raised position above the bottom of the planing hull for water borne movement.

2. The invention defined in claim 1, wherein said resilient suspension means includes movable support means for said suspension means, and locking means for releasing the movable support means for raising said wheels from a lowered position.

3. The invention defined in claim 2, wherein the suspension means consists of inflatable air bags.

4. The invention defined in claim 2, wherein said suspension means includes an elongated member having one end pivotally connected with the hull, the other end of the elongated member including means to detachably secure the member to the hull, and a resilient suspension member positioned between a medial portion of said elongated member and a wheel support means, whereby the hull may be resiliently supported by the wheels.

5. The invention defined in claim 4, wherein the suspension member comprises an inflatable air bag.

6. The invention defined in claim 4, wherein said suspension means includes releasable locking means to hold the wheels in lowered position.

7. The invention defined in claim 4, wherein said means to detachably secure the other end of the elongated member comprises a U-shaped latch member encircling the end of the elongated member and pivotally attached to an element, connected with the hull.

8. The invention defined in claim 7, wherein said other end of elongated member terminates in a raised lip for retaining said latch member in locked position.

9. The invention defined in claim 1, wherein said resilient suspension means includes a pair of rods having their one ends pivotally connected with a wheel support.

10. The invention defined in claim 9, wherein the pairs of rods comprising the suspension means for two of said wheels are arranged in generally horizontal position when the wheels are supporting the hull, a respective one of each pair of rods being connected with a respective wheel support below the axle of the wheel and extending away from the wheel support in one direction, the respective other end of each pair of rods being connected above the axle of the wheel and extending away from the wheel support in the opposite direction.

11. The invention defined in claim 10, wherein the pairs of rods comprising the suspension means for another two wheels are connected to extend forwardly away from the wheel support for said another two wheels in generally parallel disposition.

12. The invention defined in claim 1, wherein said differential housing means includes steerable support means for said pair of driven ground-engaging wheels and said hull includes steering wheel means, and means operatively connecting the steering wheel means with said steerable support means.

13. The invention defined in claim 12, wherein said means connecting the steering wheel means and said support means includes means for disconnecting the steering wheel means when said differential housing means has been raised whereby said steering wheel means may be connected with a boat steering means.

14. The invention defined in claim 13, wherein said means for disconnecting the steering wheel means includes a pair of aligned elongated members for transmitting longitudinal motion, and means for selectively coupling and uncoupling said aligned members.

15. The invention defined in claim 14, wherein one of said motion transmitting members is supported by hanger means pivotally suspended on an element of said hull.

16. The invention defined in claim 1, wherein said motive power means includes automotive transmission means for transmitting power to said drive shaft means.

17. The invention defined in claim 16, wherein said motive power means also includes clutch means selectively engageable for connection with said drive shaft means and said marine propulsion means.

18. The invention defined in claim 17, wherein said marine propulsion means includes propeller means, and mounting means for positioning said propeller means at one level when the hull is water borne and at another level when the hull is land based.

19. The invention defined in claim 18, wherein said propeller means includes so-called "inboard-outboard" mounting means.

20. In amphibious vehicles including a water borne hull, the combination including motive power means mounted in said hull, marine propulsion means mounted externally at the stern of the hull, a pair of driven ground-engaging wheels including resilient suspension means mounted externally at one end of said hull, another pair of ground-engaging wheels including resilent suspension means for each wheel mounted externally at the other end of said hull, said driven pair of wheel including differential housing, and axle means extending transversely externally of the hull and drive shaft means connected with the differential housing means and extending longitudinally through the hull to connection with said motive power means, means for selectively connecting said motive power means to drive said marine propulsion means and said drive shaft means, said resilient suspension means for both said pairs of wheels including means for maintaining said wheels in a lowered position for driving on land and in a raised position for water borne movement.

* * * * *